United States Patent [19]

Shank

[11] 4,307,545
[45] Dec. 29, 1981

[54] CYLINDRICAL GRINDING MACHINE

[75] Inventor: William E. Shank, Waynesboro, Pa.

[73] Assignee: Litton Industrial Products, Inc., Waynesboro, Pa.

[21] Appl. No.: 168,455

[22] Filed: Jul. 10, 1980

[51] Int. Cl.³ .............................................. B24B 5/04
[52] U.S. Cl. .................................................. 51/237 R
[58] Field of Search ......... 51/165.78, 216 ND, 237 R, 51/237 CS

[56] References Cited

U.S. PATENT DOCUMENTS

| 2,214,166 | 9/1940 | Hertlein | 51/237 R |
| 2,236,057 | 3/1941 | Grone | 51/237 CS |
| 3,747,283 | 7/1973 | Price | 51/237 CS |
| 3,769,761 | 11/1973 | Ohsima | 51/237 CS |

*Primary Examiner*—Harold D. Whitehead
*Attorney, Agent, or Firm*—Spencer T. Smith

[57] ABSTRACT

A cylindrical grinding machine comprising a work spindle, reversible motor means for rotatively driving the work spindle in a first rotational direction during a machining operation and in a second opposite rotational direction, means for stopping the work spindle, rotating in the second direction, at a predetermined angular position including key means secured to the work spindle at a predetermined angular position, bracket means mounted for pivotal displacement from a raised position to a lowered position, means for maintaining the bracket means at the raised position, stop means mounted on the bracket means for pivotal displacement from a retracted position to an advanced key blocking position, means for displacing the stop means from the retracted to the advanced position whereby rotation of the spindle in the second opposite direction will engage the key with the stop means rotatively displacing the bracket from the raised to the lowered position and means for maintaining the spindle means at the selected angular position including latch means mounted for pivotal displacement from a retracted position to an advanced position for locking the key between the latch means and the stop means, and means for pivotally displacing the latch means from the retracted position to the advanced position when the bracket has been pivotally displaced from its raised to its lowered position.

1 Claim, 1 Drawing Figure

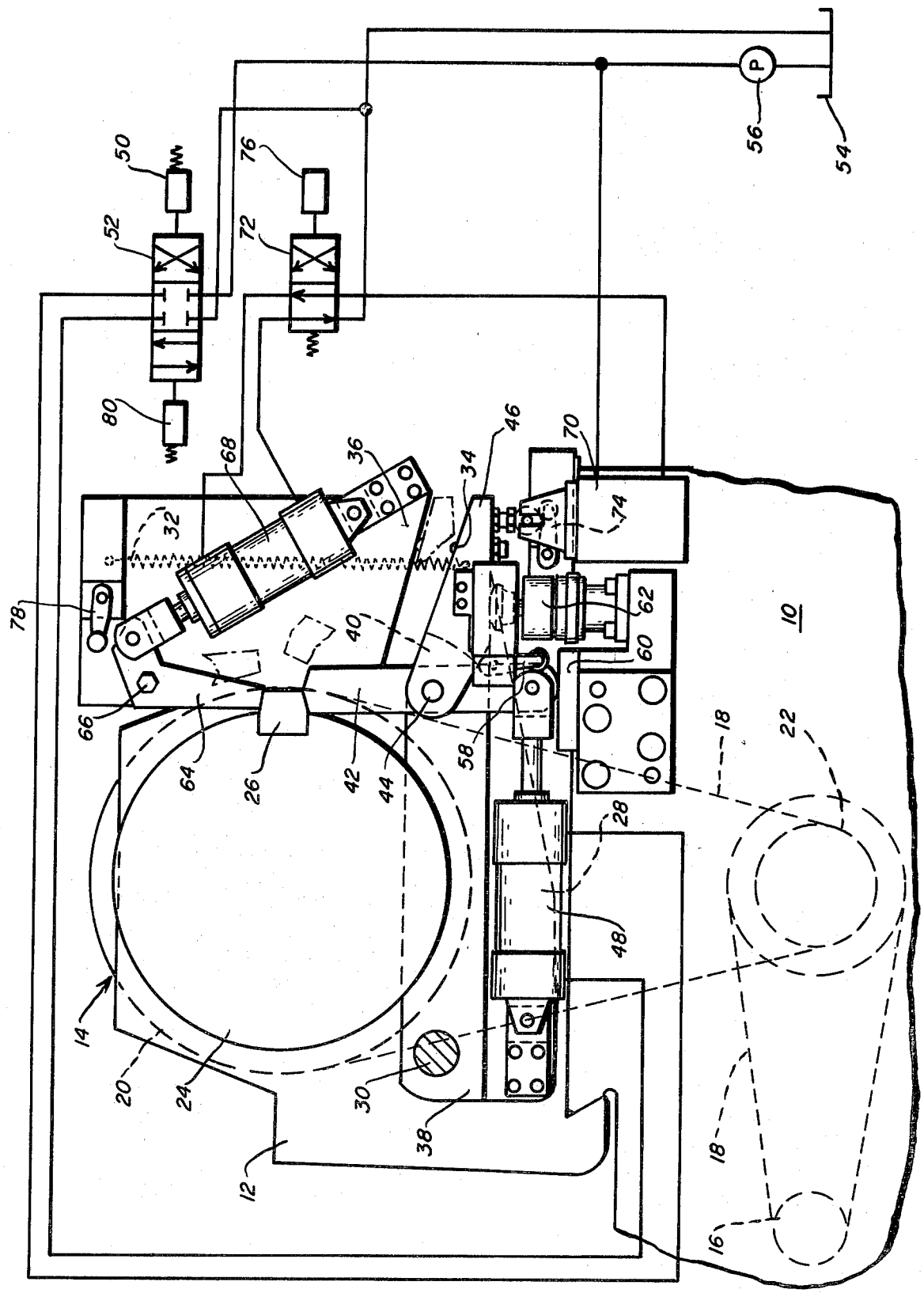

CYLINDRICAL GRINDING MACHINE

This invention relates to cylindrical grinding machines wherein a work spindle is selectively angularly oriented.

In cylindrical grinding machines, it is often desirable to precisely angularly locate and maintain the work spindle during the loading and unloading of the workpiece.

An object of the present invention is to provide an improved mechanism for stopping and locking a work spindle of a cylindrical grinding machine at a precise angular position.

Other objects and advantages of the present invention will become apparent from the following portion of this specification and from the accompanying drawing which illustrates, in accordance with the mandate of the patent statutes, the presently preferred embodiment incorporating the principles of the invention.

The sole FIGURE is an elevational view of a cylindrical grinding machine having a spindle angular positioning mechanism made in accordance with the teachings of the present invention.

The cylindrical grinding machine includes a base 10 which supports a work spindle housing 12. The work spindle assembly 14 is rotatably driven by a dynamically brakeable reversible electric motor 16 which is operatively connected by belts 18 to a spindle pulley 20 via a jackshaft pulley 22. The motor 16 drives the work spindle 14 in a counterclockwise direction while the workpiece is being machined, stops the work spindle at a random angular position and rotates the work spindle 14 in an opposite angular positioning direction.

The work spindle 14 includes a wheel 24 having a projecting key insert 26. A bracket 28 is provided which is mounted for pivotal displacement on a post 30 secured to the spindle housing 12. A spring 32 biases the bracket 28 upwardly towards a raised position (shown in phantom) where an adjustable stop screw 34 engages a plate 36 mounted to the spindle housing 12. The bracket 28 includes a left-hand portion 38, a central slotted portion 40 in which a stop member 42 is pivotally mounted on a crosspin 44 or the like and a right-hand or front portion 46. The stop member 42 is pivotally displaceable from a retracted position (shown in phantom) to an advanced position for blocking the spindle key 26 by a first hydraulic cylinder 48 pivotally mounted at one end to the left-hand portion 38 of the bracket 28 and pivotally secured at the other end to the bottom portion of the stop member 42.

After the motor 16 has stopped the spindle 14 at a random angular location, a first solenoid 50 associated with the stop member control valve 52 is activated to allow fluid, which is supplied from a reservoir 54 via a pump 56, to be directed to the first hydraulic cylinder 48 to advance the stop member 42 to its blocking position where a switch 58 is tripped. The motor 16 is then driven in a reverse direction to rotate the work spindle 14 clockwise until the key 26 engages with the stop member 42. Further rotation displaces the stop member 42, and hence, pivots the bracket 28 to its lowered position where the stop member 42 engages with a stop plate 60 thus locating the work spindle at a predetermined angular position, as shown in the drawing. A deceleration valve 62 is provided to absorb the shock caused by the key 26 engaging the stop member 42 and to gradually slow its movement as it rotates to the stop position.

The system thus far described is conventional, except that in a conventional system an electric motor is utilized to rotatively drive the work spindle in the machining direction and a separate hydraulic motor is utilized to rotate the spindle clockwise in the opposite angular positioning direction and to maintain the work spindle properly oriented.

In the present invention, a latch arm 64 is provided to physically lock the key 26 in the predetermined position. The latch arm 64 is mounted on a pin 66 extending from the spindle housing plate 36 and is pivotally displaceable from a retracted position (shown in phantom) to an advanced locking position by a second hydraulic cylinder 68 which extends between the housing plate 36 and one end of the latch arm 64. As the bracket 28 is displaced to its lowered position, a throttle valve 70 is operated allowing fluid to flow to the second cylinder 68 through the latch control valve 72. A switch 74 is also tripped by the lowered bracket 28 which deenergizes the latch control valve solenoid 76 causing the latch control valve 72 to change its condition directing fluid to the opposite end of the second cylinder 68 to advance the latch 64 to lock the key 26 between the latch 64 and the stop member 42. As the latch 64 is advanced, a switch 78 associated with the latch is released stopping the motor 16 and deenergizing the first stop member control valve solenoid 50 returning that valve 52 to a neutral position, as shown. In the preferred embodiment, bevelled surfaces on the key 26, the stop member 42, and the latch 64 assure precise positioning of the work spindle.

To unlock the work spindle 14, the latch control valve solenoid 76 is energized and the latch 64 is retracted. The latch switch 78 is tripped which energizes the second stop member control valve solenoid 80 to retract the stop member 42 allowing for free work spindle rotation. The spring 32 returns the bracket 28 to its raised position thereby closing the throttle valve 70. The latch control valve solenoid 76 remains energized to prevent accidental advancement of the latch 64 but the throttle valve 70 serves as an additional safeguard by shutting off the flow of fluid to the latch cylinder 68.

What is claimed is:
1. A cylindrical grinding machine comprising
a work spindle,
reversible motor means for rotatively driving said work spindle in a first rotational direction during a machining operation and in a second opposite rotational direction,
means for stopping said work spindle, rotating in said second direction, at a predetermined angular position including
key means secured to said work spindle at a predetermined angular position,
bracket means mounted for pivotal displacement from a raised position to a lowered position,
means for maintaining said bracket means at said raised position,
stop means mounted on said bracket means for pivotal displacement from a retracted position to an advanced key blocking position,
means for displacing said stop means from said retracted to said advanced position whereby rotation of said spindle in the second opposite direction will engage said key with said stop means rotatively displacing said bracket from said raised to said lowered position and means for maintaining said spindle means at said selected angular position including latch means mounted for pivotal displacement from a retracted position to an advanced position for locking said key between said latch means and said stop means, and means for pivotally displacing said latch means from said retracted position to said advanced position when said bracket has been pivotally displaced from its raised to its lowered position.

* * * * *